(12) United States Patent
Chung et al.

(10) Patent No.: US 12,533,710 B2
(45) Date of Patent: Jan. 27, 2026

(54) ANTI-FOULING AND ANTI-CORROSION PROTECTIVE COATING METHOD

(71) Applicant: Amerasia International Technology, Inc., Princeton Junction, NJ (US)

(72) Inventors: Kevin Kwong-Tai Chung, Princeton, NJ (US); Albert Han-Ping Chung, Princeton, NJ (US)

(73) Assignee: Amerasia International Technology, Inc, Princeton Junction, NJ (US)

( * ) Notice: Subject to any disclaimer, the term of this patent is extended or adjusted under 35 U.S.C. 154(b) by 0 days.

(21) Appl. No.: 18/631,878

(22) Filed: Apr. 10, 2024

(65) Prior Publication Data

US 2024/0342754 A1    Oct. 17, 2024

Related U.S. Application Data

(60) Provisional application No. 63/546,375, filed on Oct. 30, 2023, provisional application No. 63/472,936, (Continued)

(51) Int. Cl.
*B05D 7/16* (2006.01)
*B05D 1/02* (2006.01)
(Continued)

(52) U.S. Cl.
CPC ............ *B05D 7/16* (2013.01); *B05D 1/02* (2013.01); *B05D 1/28* (2013.01); *B05D 3/102* (2013.01);
(Continued)

(58) Field of Classification Search
None
See application file for complete search history.

(56) References Cited

U.S. PATENT DOCUMENTS 3,377,193 A * 4/1968 Stilmar ............... C09D 127/12
75/235
4,557,977 A    12/1985 Memmer et al.
(Continued)

FOREIGN PATENT DOCUMENTS

CN    111013988 A    4/2020

OTHER PUBLICATIONS

AI Technology, Inc, "Product Data Sheet—SC7130-CC" Nov. 8, 2021 (Year: 2021).*

(Continued)

*Primary Examiner* — Michael P. Rodriguez
(74) *Attorney, Agent, or Firm* — Clement A. Berard; DANN, DORFMAN, HERRELL and SKILLMAN, P.C.

(57) ABSTRACT

A method of coating a surface of a metal structure in situ comprises the steps of applying an liquidous under coating of a modified polyvinylidene fluoride (PVDF) or polyvinylidene difluoride (PVDF) material in an air dryable solution, and then applying a liquidous over coating of a modified polyvinylidene fluoride (PVDF) or polyvinylidene difluoride (PVDF) material in an air dryable solution. The under coating has: a PVDF or a PVDF co-polymer or a combination thereof of less than about 75% blended with at least about 25% compatible acrylic and/or other compatible polymer; and the PVDF or PVDF co-polymer or blend thereof has a particular PVDF molecular structure and a polymer crystallinity. The over coating has: a PVDF or a PVDF co-polymer or a blend thereof that is fluorinated to at least about 70% and at least about 70% PVDF molecular structure.

12 Claims, 12 Drawing Sheets

Related U.S. Application Data filed on Jun. 14, 2023, provisional application No. 63/507,877, filed on Jun. 13, 2023, provisional application No. 63/459,297, filed on Apr. 14, 2023.

(51) Int. Cl.
  *B05D 1/28* (2006.01)
  *B05D 3/10* (2006.01)
  *B05D 3/12* (2006.01)
  *B05D 7/00* (2006.01)
  *C09D 7/20* (2018.01)
  *C09D 127/16* (2006.01)
  *C09D 127/22* (2006.01)

(52) U.S. Cl.
  CPC .............. *B05D 3/12* (2013.01); *B05D 7/54* (2013.01); *C09D 7/20* (2018.01); *C09D 127/16* (2013.01); *C09D 127/22* (2013.01)

(56) References Cited

U.S. PATENT DOCUMENTS

| | | |
|---|---|---|
| 4,746,693 A | 5/1988 | Meder |
| 5,026,813 A | 6/1991 | Meder |
| 5,364,511 A | 11/1994 | Moreland et al. |
| 5,616,645 A | 4/1997 | Kuwamura et al. |
| 2006/0043327 A1 | 3/2006 | Hunter |
| 2006/0210715 A1 | 9/2006 | Amin-Sanayei et al. |
| 2012/0107500 A1 | 5/2012 | Vanpoulle et al. |
| 2012/0208922 A1 | 8/2012 | Matthijssen et al. |
| 2013/0273319 A1 | 10/2013 | Chen et al. |
| 2016/0040440 A1 | 2/2016 | Wiercinski et al. |
| 2022/0362139 A1 | 11/2022 | Pannakal et al. |

OTHER PUBLICATIONS

AI Technology, Inc, "Product Data Sheet—SC7130-Clear" Nov. 8, 2021 (Year: 2021).*
AI Technology, Inc, "Product Data Sheet—SC7133-BLACK" Nov. 8, 2021 (Year: 2021).*
AI Technology, Inc, "Product Data Sheet—SC7133-WHITE" Nov. 8, 2021 (Year: 2021).*
AI Technology, Inc, "Product Data Sheet—SC7150" Apr. 2, 2018 (Year: 2018).*
AI Technology, Inc, "Product Data Sheet—SC7150-LED" Apr. 2, 2018 (Year: 2018).*
AI-Technology, Inc., "Corrosion Protection With Field Applicable Fluoroseal® PVDF Coatings", dated on or after Jun. 14, 2023, 33 pages, https://www.aitechnology.com/wp-content/uploads/CORROSION-PROTECTION-COATING-FOR-SHIPS-WITH-NOVEL-FLUOROSEAL-PVDF-TECHNOLOGY-for-website-FINAL-with-edits-by-bob-and-finalized-by-Kevin-1.pdf.
AI-Technology, Inc., "Why does seemingly indestructible concrete buildings and infrastructures need protective coating?", dated on or after Jun. 14, 2023, 44 pages, https://www.aitechnology.com/wp-content/uploads/CONCRETE-PROTECTION-COATING-FOR-BUILDINGS-AND-INFRASTRUCTURES-WITH-NOVEL-FLUOROSEAL-PVDF-TECHNOLOGY-for-website-FINAL-with-Bobs-edits-and-finalized-by-Kevin-1.pdf.
Barrett Hugh, "MOSI Anti-Fouling Coatings for Barnacles and Zebra Mussels", Mar. 21, 2019, 15 pages, https://www.marinelink.com/news/mosi-antifouling-coatings-barnacles-zebra-464264.
AI-Technology, Inc., "Corrosion Protection", date as Jun. 14, 2023 or earlier, 6 pages, https://aitcoatings.com/pages/corrosion-protection-1.
AI-Technology, Inc., "Fluoroseal® Applications", dated as Jun. 14, 2023 or earlier, 4 pages, https://aitcoatings.com/pages/fluoroseal%C2%AE-applications.
Julianne Calapa, "PVDF vs. SMP Paint Systems: Which Is Best For Your Metal Roof?", Posted on Feb. 17, 2022, downloaded on Aug. 21, 2024, 16 pages, https://sheffieldmetals.com/learning-center/pvdf-vs-smp/.
Anish, "How Ships Fight Corrosion at Sea", Mar. 25, 2023, downloaded on Aug. 21, 2024, 20 pages, https://www.marineinsight.com/marine-safety/how-ships-fight-corrosion-at-sea/.
National Institute of Standards and Technology, Technology Administration, U.S. Department of Commerce, "Coatings for Corrosion Protection: Offshore Oil and Gas Operation Facilities, Marine Pipeline and Ship Structures", NIST Special Publication 1035, Apr. 14-16, 2004, Biloxi, Mississippi, downloaded on Aug. 21, 2024, 276 pages, https://www.govinfo.gov/content/pkg/GOVPUB-C13-14327283e491f213d199e8c784e520bc/pdf/GOVPUB-C13-14327283e491f213d199e8c784e520bc.pdf (276 pages submitted in 9 parts).
Shivananda Prabhu, "Coatings for Marine Applications & Offshore Platforms", Published: Apr. 16, 2020, Last updated: Jul. 19, 2024, downloaded on Aug. 21, 2024, 23 pages, https://www.corrosionpedia.com/2/1790/industries/coatings-for-marine-applications-offshore-platforms.
Eastman, "Technical Data Sheet—Eastman Texanol Ester Alcohol", Dec. 15, 2021, 3 pages.
Kevin Chung & Albert Chung, "Additional Background of Invention", Apr. 2023, 18 pages.
AGC Chemicals Americas, "Lumiflon solvent based resins", (c) 2021, downloaded Aug. 21, 2024, 7 pages, https://lumiflonusa.com/products/.
AGC Chemicals, "Lumiflon®", downloaded Aug. 21, 2024, 10 pages, https://www.agc-chemicals.com/jp/en/fluorine/products/detail/index.html?pCode=JP-EN-F002.
AI Technology, Inc, "Product Data Sheet—Concrete Fluoroseal CRC-V-7150", Ver. 2.2, Jun. 1, 2023, 1 page.
AI Technology, Inc, "Product Data Sheet—Concrete Protection CRC-H-7280", Ver. 2.2, Jun. 1, 2023, 1 page.
AI Technology, Inc, "Product Data Sheet—Concrete Protection CRC-H-7180", Ver. 2.2, Jun. 1, 2023, 1 page.
AI Technology, Inc, "Product Data Sheet—Solarthru Potting/Coating SC7130", Ver. 2.3, Dec. 28, 2023, 1 page.
AI Technology, Inc, "Product Data Sheet—Solar Grip Coating SC7150", Ver. 2.0, Apr. 2, 2018, 1 page.
AI Technology, Inc, "Product Data Sheet—Fluoroseal® SC7130-CC", Ver. 3.8, Nov. 8, 2021, 1 page.
AI Technology, Inc, "Product Data Sheet—Concrete Fluoroseal CRC-V-7130", Ver. 2.1, Apr. 26, 2023, 1 page.
AI Technology, Inc, "Product Data Sheet—Fluoroseal® Over-Coating SC7150-UVB", Ver. 2.3, Apr. 20, 2022, 1 page.
AI Technology, Inc, "Product Data Sheet—SolarBloc Fluoroseal® SC7130-UVB", Ver. 2.7, Sep. 28, 2023, 1 page.
AI Technology, Inc, "Product Data Sheet—Solarthru Potting/Coating SC7130-Clear", Ver. 2.2, Nov. 8, 2021, 1 page.
AI Technology, Inc, "Product Data Sheet—Fluoroseal® SCX7130-CC", Ver. 2.2, Jul. 18, 2023, 1 page.
AI Technology, Inc, "Product Data Sheet—Fluoroseal® SCX7180-UCC", Ver. 3.1, Sep. 22, 2022, 1 page.
AI Technology, Inc, "Product Data Sheet—SolarBloc Coating SC7133-Black", Ver. 2.2, Nov. 8, 2021, 1 page.
AI Technology, Inc, "Product Data Sheet—SolarBloc Coating SC7133-White", Ver. 2.1, Nov. 8, 2021, 1 page.
AI Technology, Inc, "Product Data Sheet—Transparent Potting SC7150-LED", Ver. 2.0, Apr. 2, 2018, 1 page.
AI Technology, Inc, "Product Data Sheet—Fluoroseal® Over-Coating SC7150-OC", Ver. 2.1, Mar. 28, 2022, 1 page.
ISA/US, International Search Report and Written Opinion, PCT/US24/24219, Jul. 11, 2024, 18 pages.
ISA/US, International Search Report and Written Opinion, PCT/US2024/024230, Jun. 10, 2024, 20 pages.
USPTO, U.S. Appl. No. 18/631,760, Notice of Allowance and Fee(s) Due; Jun. 9, 2025, 14 pages.

* cited by examiner

| Properties Required for Effective Protection of Vertical Surfaces | SILICONE | Acrylic-Stucco | FLUOROSEAL® for Concrete (CPV7130 Gloss, Air Drying) (CPV7150 Matt, Air Drying) (CPH7280 Crosslinked, Air Drying) |
|---|---|---|---|
| Moisture-Water Permeability (Relative Ingress Number, $g/m^2 \cdot d$) | Very High (>5,000) | High (>20) | Very Low (<0.05) |
| Corrosive Gases (e.g. $H_2S$, $C_2O$, etc.) Permeability ($cm_3/m_2 \cdot d \cdot bar$) | Very High (>5,000) | Very High (>2,000) | Very Low (<0.1) |
| Water Repellant | Good | Good | Good |
| Water Absorption (Retention) | Low | Low | Low |
| UV Molecular Stability (Resistance) | Good (Proven 10-20 Years) | Fair (Proven <10 Years) | Outstanding (Proven >60 Years) |
| Choices of Color | 1. Clear 2. Others | 1. Colored 2. Customized | 1. Colored 2. Customized |
| Field Application Method | Spray, Brush (1-Component, Ambient Storage, Coating Liquid) | Spatter (1-Component, Ambient Storage, Coating Liquid) | Spray, Roller, Brush (1-Component, Ambient Storage, VOC Free, Coating Liquid) |
| Cost of Material and Labor | Similar for material and Labor for the same performance level (Thicker: >200 Micron) | Higher Price for Stucco | Similar for material and Labor for the same performance level (Thickness: >50 Micron) |

The above table summarizes properties of FLUOROSEAL® Protection Coating CRC-V-7150 and CRC-H-7280 in comparison to silicone and acrylic coatings used.

Corrosion Protection Coating
FLUOROSEAL® CPC-EXT-7280
(Abrasion Resistant Crosslinked Gloss Finish)

- For blocking moisture, salt fog and spray, acid rain and moisture laden with acid gases from penetrating through epoxy coating into structural steels

- For blocking $H_2S$, $CO_2$ and other corrosive gases from penetrating to cause steel corrosion

- For blocking UV in penetrating epoxy-polyurethane coating to cause molecular damages

- Orders of magnitude more effective as moisture and corrosive gases barrier than acrylic epoxy, polyurethane

- Flouropolymer proven with >60 Years UV Stability

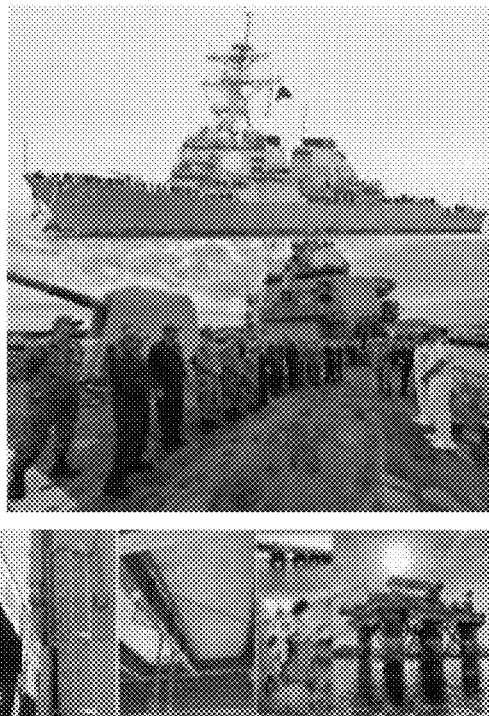

Instruction for proper use of FLUOROSEAL® CPC-EXT-7280 (Abrasion Resistant Crosslinked Gloss Finish) for steel infrastructure (bridges, tunnels, etc.) corrosion protection:

Content: 5 Gallon
*FOR INDUSTRIAL USE ONLY*

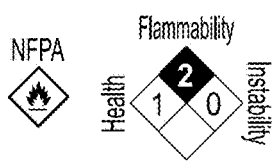

NFPA

Flammability 2
Health 1
Instability 0

KEEP AWAY FROM CHILDREN

DANGER!
CONTAINS VOC EXEMPT
FLAMMABLE SOLVENT
(Please consult SDS before using)

1. FLUOROSEAL® CPC-EXT-7280 is an abrasion resistant, crosslinked gloss finish coating for corrosion protection of structural steel used in infrastructure, oil-gas pipeline, storage and shipping tankers with epoxy and for polyurethane coating.

2. Make sure surfaces are free of dirt, wax, grease and all other contaniments for best adhesion and corrosion protection of structural steels and other metals.

3. Mask all areas that do not need protection if applicable.

4. Remove any condensation on surfaces before applying protection coating.

5. Shake coating in container vigorously before using.

6. Make sure enough ventilation is available to avoid breathing in solvent vapor.

7. Brush, roller or spray coat at least two passes to ensure complete coverage. Thickness of 25-75 micron is sufficient for best protection. Thicker coating can also be used if deemed needed. Add acetone solvent for dilution if for spray coating whenever needed.

8. The coating will dry to touch in less than 15 minutes. Ambient dry overnight for complete coating curing.

9. Ambient temperature storage only.

AI Technology, Inc. 70 Washington Road,
Princeton Junction, NJ 08550, USA
Tel: (609) 799-9388 www.aitcoatings.com
ait@aitechnology.com
*Over 40 Years of Excellence and Leadership in Advanced Coatings and Adhesives*

CONTAINS: Solvent T-ButylAcetate (540-88-5), Acetone (67-64-1), 2-Heptamone (110-43-0), Propylene carbonate (108-32-7)); Modified flourinated polymer and additives (Non-Hazardous and Proprietary).

DANGER FLAMMABLE: Keep away from sparks, heat or open flames. Vapors will accumulate readily and may ignite explosively. Keep area ventilated during use and until all vapors are gone. DO NOT SMOKE - Extinguish all flames, pilot light and heaters, and any other sources of ignition.

VAPOR HARMFUL! Use with adaquate ventilation, Avoid continuous breathing of vapor and spray mist. If you experience eye irritating, headaches, or dizziness, increase fresh air or wear respiratory protection (NIOSH/MSHA approved) or leave the area.

FIRST AID - In case of eye contact, flush thoroughly with plenty of water for 15 minutes and get medical attention. For skin contact, wash thoroughly with soap and water. In case of resporatory difficultly, provide fresh air and call physician.

NOTE: INTENTIONAL MISUSE BY DELIBERATELY CONCENTRATING AND INHALING THE CONTENTS MAY BE HARMFUL OR FATAL.

Before using, user shall determine the suitability of the product for his intended use. The manufacturer should not be liable for any injury, loss or damage, direct or consequential, arising out of the use or non-performance with the use of this product. User assumes all risks and liability in-connection with the use of the product.

FIG. 6B

Concrete Protection Coating
FLUOROSEAL® CRC-H-7280

600

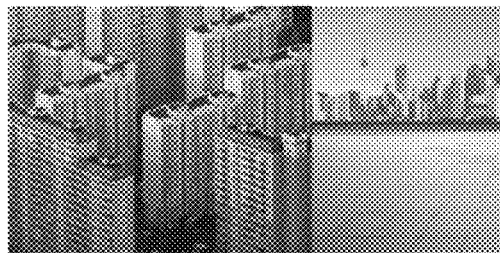

- Fluoropolymer for >60 years outdoor UV protection
- Crosslinked for abrasion resistance and traffic
- For blocking moisture, salt fog and spray, acid rain and moisture from penetrating into concrete
- For blocking $CO_2$, $H_2S$, and other corrosive gases from penetrating into concrete and rebar Interfaces
- Coat directly on concrete surfaces for preventing rebar corrosion and concrete weakening
- Orders of magnitude more effective as moisture and corrosive gases barrier than silicone, acrylic, epoxy and polyurethane

FLUOROSEAL® CRC-H-7280

Instruction for proper use of FLUOROSEAL® CRC-H-7280 for outdoor concrete horizontal surfaces (rooftop and walkway) protection:

Content: 5 Gallon
*FOR INDUSTRIAL USE ONLY*

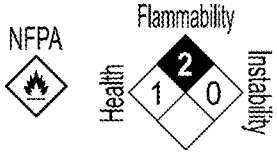

KEEP AWAY FROM CHILDREN

| DANGER! |
| --- |
| CONTAINS VOC EXEMPT FLAMMABLE SOLVENT |
| (Please consult SDS before using) |

1. FLUOROSEAL® CRC-H-7280 is a clear concrete protection coating designed for outdoor horizontal surface use (rooftop and walkway, not for indoor floorings).
2. Make sure concrete, cement, plaster surfaces are free of dirt, wax, grease and all other containments for best adhesion on concrete surfaces and protection of concrete reinforcing steel bars.
3. May be used as UV protection over-coating on epoxy or polyurethane surfaces.
4. Remove any surface condensation before applying concrete protection coating.
5. Shake concrete in container vigorously before using.
6. Make sure enough ventilation is available to avoid breathing in solvent vapor.
7. Coat two passes to ensure complete coverage. Thickness of 25-75 micron is sufficient for best protection. Thicker coating can also be used if deemed needed. Add acetone solvent for dilution.
8. The coating will dry to touch in less than 15 minutes. Ambient curing overnight or longer (depending on ambient temperature) before walking on surface.
9. Ambient temperature stage only.

AI Technology, Inc. 70 Washington Road,
Princeton Junction, NJ 08550, USA
Tel: (609) 799-9388 www.aitcoatings.com
ait@aitechnology.com
*Over 40 Years of Excellence and Leadership
in Advanced Coatings and Adhesives*

CONTAINS: Solvent T-ButylAcetate (540-88-5), Acetone (67-64-1), 2-Heptamone (110-43-0), Propylene carbonate (108-32-7)); Modified flourinated polymer and additives (non-hazardous and proprietary).

DANGER FLAMMABLE: Keep away from sparks, heat or open flames. Vapors will accumulate reedily and may ignite explosively. Keep ventilated during use and until all vapors are gone. DO NOT SMOKE - Extinguish flames, pilot light and heaters, and any other sources of ignition.

VAPOR HARMFUL! Use with adaquate ventilation, avoid continuous breathing of vapor and spray mist. If you experience eye irritation, headaches, or dizziness, increase fresh air or wear respiratory protection (NO SHIME-approved) or leave the area.

FIRST AID - In case of eye contact, flush thoroughly with plenty of water for 15 minutes and get medical attention. For skin contact, wash thoroughly with soap and water. In case of resporatory difficultly, provide fresh air and call physician.

NOTE: INTENTIONAL MISUSE BY DELIBERATELY CONCENTRATING AND INHALING THE CONTENTS MAY BE HARMFUL OR FATAL.

Before using, user shall determine the suitability of the product for his intended use. The manufacturer should not be liable for any injury, loss or damage, direct or consequential, arising out of the use or non-performance with the use of this product. User assumes all risks and liability in-connection with the use of the product.

FIG. 7B

Concrete Protection Coating
FLUOROSEAL® CRC-V-7130

700

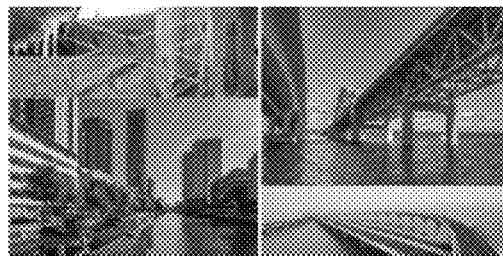

- For blocking moisture, salt fog and spray, acid rain and moisture from penetrating into concrete

- For blocking CO₂, H₂S, and other corrosive gases from penetrating into concrete and rebar Interfaces

- Coat directly on concrete surfaces for preventing rebar corrosion and concrete weakening

- Orders of magnitude more effective as moisture and corrosive gases barrier than silicone, acrylic, epoxy and polyurethane

- Fluoropolymer proven with > 60 Years UV Stability

FLUOROSEAL® CRC-V-7130

INSTRUCTION FOR PROPER USE OF TRANSPANT FLUOROSEAL® CRC-V-7130 (GLOSS FINISH) CONCRETE PROTECTION COATING:

Content: 5 Gallon
*FOR INDUSTRIAL USE ONLY*

NFPA    Flammability
  

KEEP AWAY FROM CHILDREN

DANGER!
CONTAINS VOC EXEMPT
FLAMMABLE SOLVENT
(Please consult SDS before using)

1. FLUOROSEAL® CRC-H-7280 concrete protection coating is designed for use on vertical surfaces of concrete only. Do not use for concrete floor protection.

2. Make sure concrete, cement, plaster surfaces are free of dirt, wax, grease and all other contaniments for best adhesion on concrete surfaces and protection of concrete reinforcing steel bars.

3. Mask all areas that do not need protection if applicable.

4. Remove any surface condensation before applying concrete protection coating.

5. Shake concrete in container vigorously before using.

6. Make sure enough ventalation is available to avoid breathing in solvent vapor.

7. Coat two passes to ensure complete coverage. Thickness of 25-75 micron is sufficent for best protection. Thicker coating can also be used if deemed needed. Add acetone solvent for dilution if for spray coating whatever needed.

8. The coating will dry to touch in less than 15 minutes. Ambient dry overnight for complete coating curing.

9. Ambient temperature stage only. If content frozen to get warm bottle with content in warm water bath.

AI Technology, Inc. 70 Washington Road,
Princeton Junction, NJ 08550, USA
Tel: (609) 799-9388 www.aitcoatings.com
ait@aitechnology.com
*Over 40 Years of Excellence and Leadership
in Advanced Coatings and Adhesives*

CONTAINS: Solvent T-ButylAcetate (540-88-5), Acetone (67-64-1), 2-Heptamone (110-43-0), Propylene carbonate (108-32-7)); Modified flourinated polymer and additives (non-hazardous and proprietary).

DANGER FLAMMABLE: Keep away from sparks, heat or open flames. Vapors will accumulate reedily and may ignite explosively. Keep ventilated during use and until all vapors are gone. DO NOT SMOKE - Extinguish flames, pilot light and heaters, and any other sources of ignition.

VAPOR HARMFUL! Use with adaquate ventilation, avoid continuous breathing of vapor and spray mist. If you experience eye irritation, headaches, or dizziness, increase fresh air or wear respiratory protection (NO SHIME-approved) or leave the area.

FIRST AID - In case of eye contact, flush thoroughly with plenty of water for 15 minutes and get medical attention. For skin contact, wash thoroughly with soap and water. In case of resporatory difficultly, provide fresh air and call physician.

NOTE: INTENTIONAL MISUSE BY DELIBERATELY CONCENTRATING AND INHALING THE CONTENTS MAY BE HARMFUL OR FATAL.

Before using, user shall determine the suitability of the product for his intended use. The manufacturer should not be liable for any injury, loss or damage, direct or consequential, arising out of the use or non-performance with the use of this product. User assumes all risks and liability in-connection with the use of the product.

FIG. 8B

Humid Sulfur Test at 60°C for 10 Days

ANTI-FOULING AND ANTI-CORROSION PROTECTIVE COATING METHOD

This Application claims the benefit and priority of U.S. Patent Application No. 63/546,375 filed Oct. 30, 2023, entitled "PROTECTION COATING METHOD FOR REINFORCED CONCRETE BUILDINGS AND INFRASTRUCTURE," and claims the benefit and priority of U.S. Patent Application No. 63/472,936 filed Jun. 14, 2023, entitled "PROTECTION COATING METHOD FOR REINFORCED CONCRETE BUILDINGS AND INFRASTRUCTURE," and claims the benefit and priority of U.S. Patent Application No. 63/507,877 filed Jun. 13, 2023, entitled "ANTIFOULING AND CORROSION PROTECTION PVDF COATING SYSTEMS AND METHODS," and further claims the benefit and priority of U.S. Patent Application No. 63/459,297 filed Apr. 14, 2023, entitled "PROTECTION COATING METHOD FOR REINFORCED CONCRETE BUILDINGS AND INFRASTRUCTURE," each of which is hereby incorporated herein by reference in its entirety for all purposes.

The present Application relates to a method of coating a metal structure or other object in situ, which comprises the step of applying to the surface of the metal object a liquidous coating of a modified polyvinylidene fluoride or polyvinylidene difluoride (PVDF) material in an air dryable solution.

Metal structures and objects and their proven strength and durability are the foundation of many beautiful and long-lasting structures, boats and ships, bridges, towers, offshore platforms, and other metal objects. Corrosion, including rust, are physically destructive to such structures and objects as well as to their aesthetic attributes.

For example, seawater is extremely corrosive to the basic metal structure of boats and ships both below and above the waterline, that can put their structural integrity and seaworthiness at risk, and fresh water, while less corrosive, also leads to similar degradation. Similar corrosive effects affect bridges, towers, platforms and the like that are present in moisture-laden environments, e.g., high-humidity environments, and/or proximate to a body of water.

Many different preparations, treatments and coatings have been tried and many employed with varying levels of success for preventing corrosion of various metals. Examples include epoxy, polyurethane, silicone-modified polyester, polyesters, acrylics, and their combinations, such as in products such as KYNAR® 500 series PVDF coatings and fluorinated polymers such as FEVE materials, for gloss, decorative and/or protective coating. Many, if not most of these conventional coatings, require special surface preparation, or special primers or heating, e.g., baking at high temperature, e.g., over 150° C., which effectively limits their use to factories or large facilities that can contain the necessary ovens. Those that could be applied in the field, such as aquatic KYNAR® and FEVE materials, require solvents that are either undesirable or reduce their effectiveness as protective coatings.

Where there are sources of corrosive gases, such as $H_2S$, $SO_2$, $CO_2$, $NO$, $CL_2$ in the air, those gases can penetrate conventional protective coatings to attack the underlying metal parts, e.g., by reacting with water and/or being carried by moisture that penetrates such conventional coatings and cause corrosion of steel and other metals thereunder.

Marine and naval corrosion and corrosion protection have been estimated to cost 4% or more of world GDP, and the total cost may be substantially greater.

Traditionally, most larger ships and marine assets are built with steel because of its low cost and very high structural strength. These ships and assets typically are protected from corrosion attacks by multiple layers of organic coatings and primers. Organic coatings and primers are primarily alkyd-based or are epoxy loaded with zinc or zinc compounds as primers followed by thick layers of epoxies, and sometimes with a polyurethane coating top layer. Based on the particular application, the total thickness of these coatings can be as high as 250 microns to 1000 microns depending upon the service environment and conditions.

Applicant believes there is a need for a better method for protecting metal structures and other objects from corrosion and the degradation that results.

Accordingly, a method of coating a surface of a metal structure in situ, which comprises the steps of applying a liquidous under coating of a modified polyvinylidene fluoride (PVDF) or polyvinylidene difluoride (PVDF) material in an air dryable solution, and then applying a liquidous over coating of a modified polyvinylidene fluoride (PVDF) or polyvinylidene difluoride (PVDF) material in an air dryable solution. The under coating has: a PVDF or a PVDF co-polymer or a combination thereof of less than about 75% blended with at least about 25% compatible acrylic and/or other compatible polymer; and the PVDF or PVDF co-polymer or blend thereof has a particular PVDF molecular structure and a polymer crystallinity. The over coating has: a PVDF or a PVDF co-polymer or a blend thereof that is fluorinated to at least about 70% and at least about 70% PVDF molecular structure.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIG. 3 is a chart comparing certain prior art coatings with an example suitable PVDF coating;

FIGS. 6A-6B are a technical data sheet for an example liquidous PVDF coating of the sort employed in the described embodiments;

FIGS. 7A-7B and 8A-8B are technical data sheets for respective other examples of liquidous PVDF coatings of the sort employed in the described embodiments;

Figure 1:
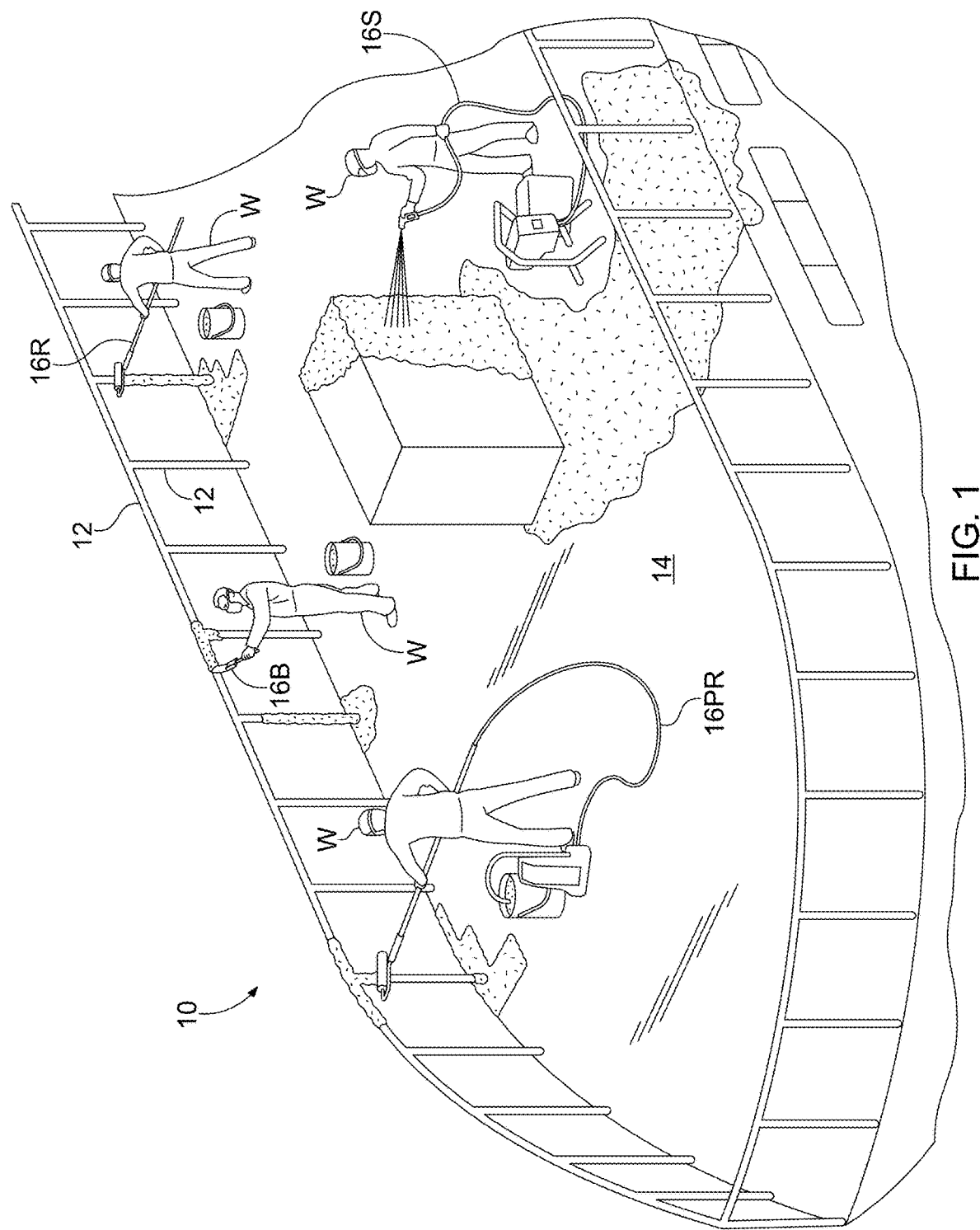
FIG. 1 is an illustration of an example embodiment of applying the example liquidous coating to a metal structure such as a boat or ship by spraying, rolling and/or brushing.

In the Drawing, where an element or feature is shown in more than one drawing figure, the same alphanumeric designation may be used to designate such element or feature in each figure. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Prior art FEVE (fluoroethylene vinyl ether) coatings such as LUMIFLON® coatings from AGC Chemicals America ("AGC") are available, and while they may have some UV resistance as a fluorinated polymer, they do not have the same molecular structure or moisture impermeability as the PVDF coating materials described below.

FEVE field applicable coatings such as LUMIFLON® coatings from AGC are available. (https://lumiflonusa.com/) "LUMIFLON® solvent based resins have been in use for over 35 years, in applications as diverse as bridge coatings, coil coatings for architectural applications, automotive coatings, and aerospace coatings, to improve weatherability and appearance. These ultra-weatherable resins can be formulated into coatings with a wide range of gloss and color. They can be used in the field for re-coating of structures, or in the shop to manufacture pre-coated panels." FEVE resins are thermosetting while PVDF is thermoplastic.

The technical problem with most conventional coating materials, including some fluorinated polymers, that reduce or inhibit the passage of moisture and/or undesirable gases is that they require application and/or curing processes that can only be performed in a controlled setting, and as a result, they can only be applied on relatively small articles that can be processed in such controlled setting, e.g., typically in a building or shelter with specialized equipment.

This renders such materials unsuitable for coating large metal structures and/or objects, e.g., buildings, bridges, culverts, boats and ships, platforms, and the like, which are too large to be moved and so are constructing in place, i.e. in situ, and/or are too large to be coated in such size-limited controlled settings.

In addition, most known coating materials, while they may reduce the passage of moisture and/or undesirable gases, do not substantially block the passage of moisture and/or such gases which is necessary to effectively protect metal elements and structures from corrosion, and other degradation that is the inevitable result of intrusion of moisture and such gases, which leads to the weakening of such structures and elements, and in many cases, can lead to failure.

Figure 2:
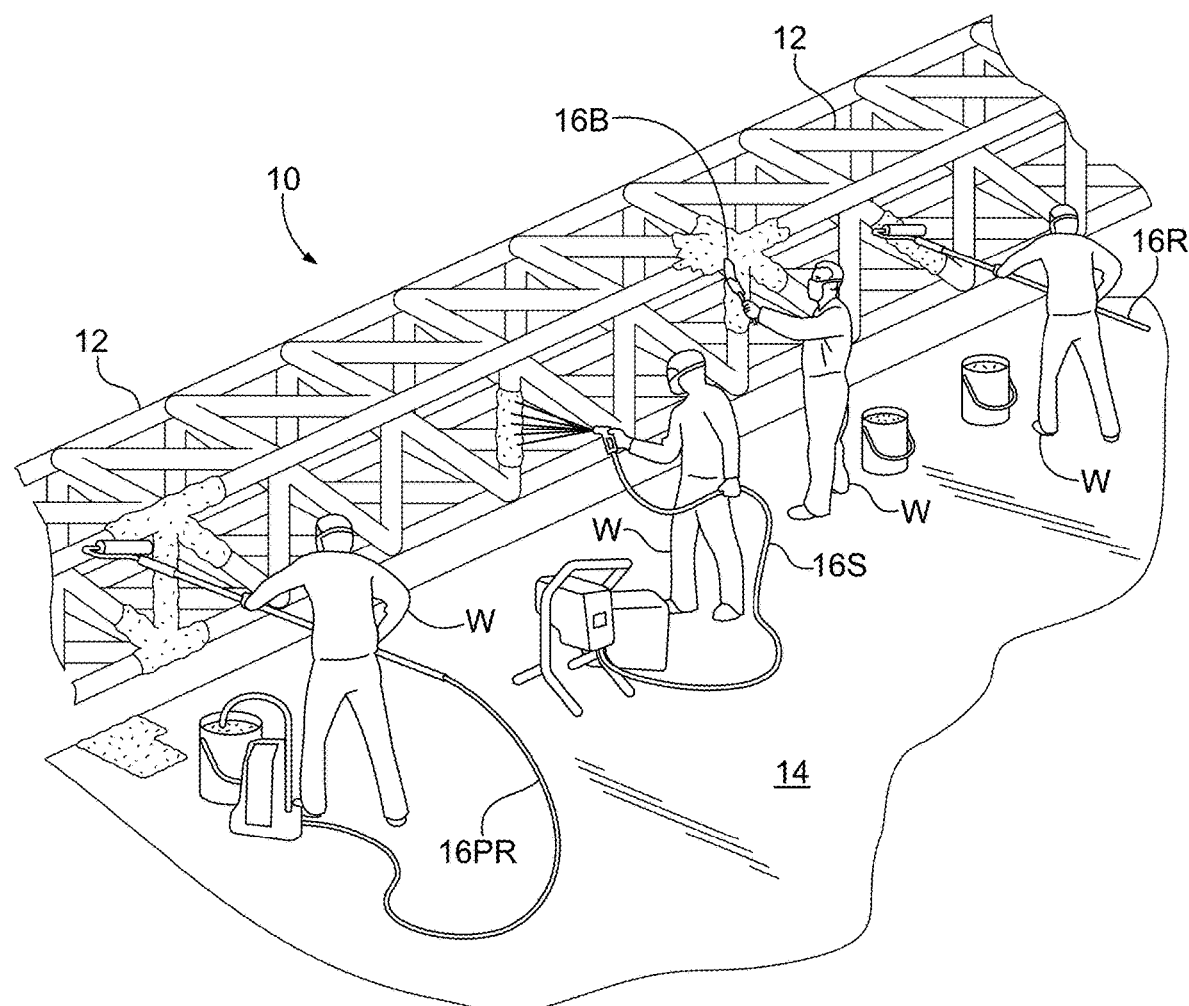
FIG. 2 is an illustration of an example embodiment of applying the example liquidous coating to a metal structural part or structure by spraying, rolling and/or brushing.

FIG. 1 is an illustration of an example embodiment of the method for applying the example liquidous coating to a metal structure such as a boat or ship by spraying, rolling and/or brushing; and FIG. 2 is an illustration of an example embodiment of the method for applying the example liquidous coating to a metal structural element or structure by spraying, rolling and/or brushing. Therein the structure 10 may include vertical structure 12 or horizontal structure 14, e.g., a side of a hull or superstructure of a boat or ship or both, and/or a part 12R of a vertical structure 12 or a part 14R of a horizontal structure 14 or both. A worker W may apply the liquidous coating material using a sprayer 16S, a roller 16R, a power roller 16PR, a brush 16B, or a combination thereof, as may be desired and efficient in any particular situation. Liquidous means having properties characteristic of a liquid.

The method described herein is particularly suited for structural and load bearing parts of metal structures, e.g., primarily the vertical parts thereof as well as some horizontal beams thereof, especially in various metal structures and infrastructure. Lesser beams and even floor supports, e.g., in structures that can receive heavy loads such as bridges, towers, platforms, building cores, and the like, can also benefit from the method described herein. Even non-load bearing parts of metal structures, which often include metal sheets and the like, can benefit from the method described herein.

This method is applicable to metal structures that are constructed above ground level including the footings, foundations and basements thereof, those constructed at about ground level, and those constructed underground, e.g., underground metal parking decks and garages, metal rail and road tunnels, metal supports for on and above ground metal structures, underground metal storage facilities, and the like. For metal structures and parts thereof that are underground, the PVDF coatings should be applied thereto prior to filling in around such underground structures with earth, gravel, sand and/or other fill materials.

Metal structures in which motor vehicles are operated or pass through or are stored, are likely exposed to exhaust gases and tracked in materials, e.g., road salts, snow and ice melting compounds, that are likely to contribute to and/or increase the deterioration of metal elements thereof. Accordingly, this method should be utilized to apply the PVDF coatings described herein to the interior surfaces thereof wherein motor vehicles are operated and/or stored.

In other words, this method is particularly suited to preserve the structural and load bearing aspects of metal structures and elements, for both existing structures and elements whether existing or under construction. The PVDF protective coatings to which the method described herein pertains has many beneficial characteristics, including for resisting corrosion and blocking passage of, e.g., moisture, water, sea water, salt ions, corrosive and other gases and the like, and for resisting fouling, e.g., by barnacles, zebra and other mussels, barnacles, tubeworms, sea squirts, seaweed, slime, slime, bacteria, algal life forms, and the like, and so may be referred to interchangeably herein as, e.g., a coating, a protective coating, a PVDF coating, and anti-corrosion coating and/or an anti-fouling coating.

Applicant has discovered that certain modified PVDF (polyvinylidene fluoride or polyvinylidene difluoride) liquid coating materials have superior ability to substantially block the passage of moisture and undesirable gases and that can be applied to metal structures "in the field," i.e. where they are located or in situ, without requiring a controlled factory environment. Applicant's coating materials can be applied to the metal of new structures and existing structures, and/or to the reinforcing elements thereof.

The terms structure, element, object and the like are used interchangeably herein to include the others as well as reinforcing thereof. The coating method described herein includes the application of two layers of a different PVDF coating materials: a first PVDF layer is applied to the metal to be protected (sometimes after a conventional surface preparation or primer) and the second PVDF layer is applied on the first PVDF coating. The first applied PVDF coating layer may also be referred to as the undercoating or primer layer, and the second applied PVDF coating layer as the overcoating or top coating layer.

FIG. 3 is a chart comparing certain prior art coatings, e.g., silicone coatings and acrylic-stucco coatings, with an example suitable PVDF coating, e.g., of the sort of PVDF coatings described herein. Therein, the PVDF coatings have a very low permeability by moisture-water and corrosive gases, thereby blocking moisture, water and corrosive gases, whereas the other materials have very high permeability thereby. In addition, the PVDF materials exhibit over 60 years of UV molecular stability, e.g., resistance to degradation from UV light, whereas the other materials provide much shorter lifetimes, e.g., only 10-20 years.

Applicant understands that moisture (water and/or salt water) comes into contact with the metal elements, e.g., metal sheets and plates, siding, reinforcing, metal beams, metal mesh, metal beams, and the like, such elements will then corrode and weaken the structure. When the alkalinity of the environment decreases to become closer to a neutral or acidic pH corrosion environment, that leads to degrading the steel or other metal elements and reinforcement in the structure.

Common elements may include elements of iron, steel, aluminum, copper, another non-noble metal, and/or alloys thereof. Stainless steels are alloys of steel that are less subject to corrosion and rusting than is common inexpensive steel, however, while the use of members and elements made from stainless steel tends to extend the time until corrosion of the elements becomes a problem, it comes at great expense. Using stainless steel elements does not remove the source of the corrosion problem.

Applicant's polyvinylidene fluoride or polyvinylidene difluoride liquid coating materials can be applied to metal structures and elements thereof in situ because they are thermoplastic and/or ambient cross-linkable crosslinked polymer materials, rather than high temperature melt bonding or thermosetting crosslinking materials which require curing at high temperature under controlled conditions that are only practical in a factory setting.

Notwithstanding the foregoing, Applicant's method can also be practiced in a factory or other controlled setting where relatively smaller structures, e.g., metal pipes, culverts, beams, and the like, can be manufactured.

Applicant has developed a new method using air dryable liquidous PVDF coating solutions that can be applied in the field and that can block corrosive elements from penetrating to the reach metal elements to cause corrosion, and moisture-related weakening of the metal elements and structure.

These coatings are believed to be the only field applicable PVDF liquid coatings that have been proven in use in electronics, electrical and structural applications by AI Technology, Inc. engineers.

Figure 4:
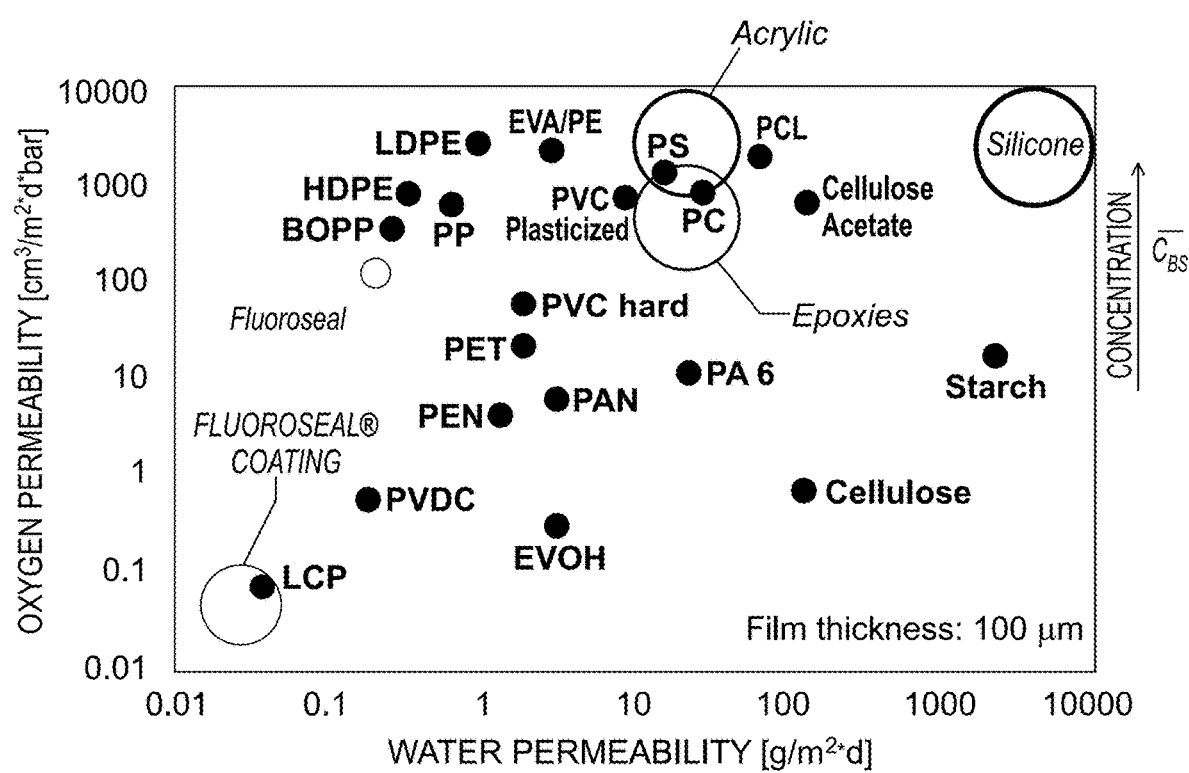
FIG. 4 is a chart illustrating the permeability characteristics of various materials including the example coating materials utilized in the present method.

FIG. 4 is a chart illustrating the permeability characteristics of various materials including the example coating materials utilized in the present method. The PVDF coating materials according to the present arrangement exhibit clearly better, e.g., lower, permeability of oxygen and water as compared to other materials, including acrylics, epoxies and silicones. The thickness of the films of those materials is 100 μm (microns) which is in the preferred range of thicknesses of the PVDF films described herein. The performance of the PVDF material is seen to be clearly superior to the other tested materials by orders of magnitude.

Figure 5:
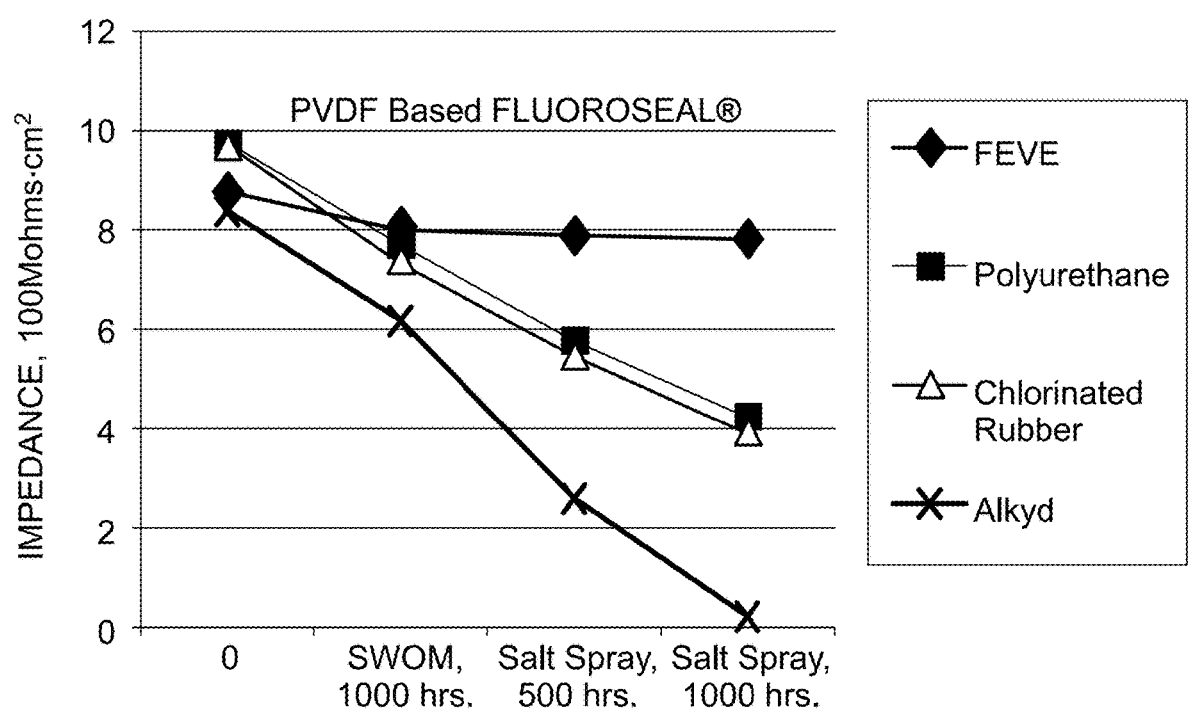
FIG. 5 is a graphical representation illustrating the impedance characteristics of various coating materials and of the example coating materials utilized in the present method.

FIG. 5 is a graphical representation illustrating the electrical impedance characteristics of various coating materials and of the example coating materials utilized in the present method. Data points from such impedance testing are presented at "0" which is the material characteristic before being exposed to potentially impedance reducing substances and/or conditions. The other data points are for the SWOM (Sunshine Carbon Arc Weather-Ometer®) test and for exposure to salt spray for 500 hours and for 1000 hours. The performance of the PVDF material is seen to be clearly superior to the other tested materials.

Electrical impedance testing provides a good indication relative to the penetration of moisture that is laden with salt and other ionic impurities, including, e.g., sodium and chloride, that cause corrosion. Electrical impedance also provides an indication for assessing effects from acid rain and other moisture and water carrying corrosive elements, such as $H_2S$, $SO_2$, $CO_2$ and other corrosive gases. Blocking moisture and preventing it from carrying ionic impurities and acidic elements onto metal members and parts is very important to protecting the underlying structural metal materials and coatings, if any applied thereto.

Conventional PVDF (polyvinylidene fluoride or polyvinylidene difluoride) coatings have been traditionally applied in the factory for preventing corrosion for metals for many years. They must be melt-fused and bonded at relatively high temperature and cannot be applied in the field or on a structure as large and as varied as buildings and infrastructures.

"Polyvinylidene fluoride or polyvinylidene difluoride is a highly non-reactive thermoplastic fluoropolymer produced by the polymerization of vinylidene difluoride. PVDF is a specialty plastic used in applications requiring the highest purity, as well as resistance to solvents, acids and hydrocarbons." (Wikipedia).

Suitable air drying PVDF coating materials useful in the described method include, e.g., FLUOROSEAL® coatings such as SC-7130; SC-7150; SC-7130-CC; SC-7150-UVB; SC-7130-UVB; SC-7130-series, SC-7150-series, SC-7133-series, SCX-7153-series of products, consisting primarily of PVDF polymer and co-polymer and blends, are available commercially from AI Technology, Inc., which has a business location at 70 Washington Road, Princeton Junction, NJ 08550, USA.

These coating products are available, e.g., from AI Technology, and were developed for protecting electronic circuits and metal structure or metallic structure with epoxy, polyurethane as over-coating protection. AI Technology's CPC-EXT-7150, CPC-EXT-7280, CPC-TC-7550, as well as CRC-V-7130 and CRC-V-7150 coating products for vertical surfaces and CRC-H-7180 and CRC-H-7280 coating products for horizontal surfaces, and CPC7550, CPC7650, CPC7750, CPC7150 and CPC7130 series coating products, are also suitable for use in the described method and are usable on metal and metal structures.

FIGS. 7A-7B are a technical data sheet for one example liquidous PVDF coating, e.g., a CRC-V-7280 coating material, of the sort employed in the described embodiments; and FIG. 8A-8B are a technical data sheet for another example liquidous PVDF coating, e.g., a CRC-H-7130 coating material, of the sort employed in the described embodiments.

In the present invention, highly fluorinated polymer-based coatings that are in liquid solution formats are used for protection coating of metal structures, parts and elements. These protective coatings can be applied in the field by brushing, rolling and spraying methods onto new or existing metal buildings and other structures, and onto metal parts and elements thereof.

Important factors for this inventive PVDF protection coating method include the following:

1. The PVDF coatings (both the first layer applied and the second layer applied, the first also being referred to as the undercoating or primer layer, and the second as the overcoating or top coating layer) must be in the form of liquid solution that can be applied in the field to metal buildings and infrastructure, and to metal elements and parts thereof.
2. The PVDF coatings must be highly fluorinated to the level of at least 30%, and preferably more than 40%; or more preferably with PVDF or PVDF copolymer or blends thereof that have more than 60% by weight of PVDF molecular structure. For the top coating, it is preferred that more than 90-100% of the PVDF molecules be in mono or copolymers.
3. Even more preferably, they are based on PVDF or PVDF co-polymers that maintain a high degree of polymer crystallinity of at least 30% and preferably more than 40%.
4. The PVDF coating first applied must have adhesion properties on metal with cross-hatch adhesion of 3B or better.
5. Thickness of the each PVDF coating should be at least 10-25 microns, and preferably 50 microns; thicker coatings are not required and may not be desired for other reasons including cost.
6. Preferably the coating is transparent or clear unless required to be pigmented or dyed for decoration. UV fluorescent dye may be added, if desired, to make inspection easier for transparent coatings.

The unit "micron" or "microns" (plural) is a common term for a micro-meter or μm, i.e. one millionth of a meter, in the metric system of measurement of the International System of Units (IS).

Applicant has found that the amount of the PVDF materials in the PVDF liquid coatings described herein should be less than about 75% so as to have sufficient adhesion to metal other substrates, and should be at least about 30% so as to provide a sufficiently robust barrier to water, salt, chemicals and other substances that are deleterious to metals and/or other materials subject to corrosion and fouling. Accordingly, about 50% to 70% by weight of the PVDF materials is believed to be a desirable range for the present invention. The weight percentages herein are exclusive of any inorganic and/or metallic additives.

The PVDF or a PVDF co-polymer or a combination of PVDF and PVDF copolymer are preferably blended with a compatible acrylic and/or other compatible polymer that is fluorinated to between about 30% to about 75% by weight excluding any solvent. The compatible acrylic and/or other compatible polymer change the polarity of the polarity of the PVDF components so that the coating will have good adhesion to the surface to which it is applied, e.g., a metal structure and other materials, to which a purely PVDF coating will not have good adhesion. Compatible acrylic polymers and/or other compatible polymers include those that can be dissolved into the PVDF coating solution and that dry in air to form a coating film on the surface to which the coating is applied, e.g., to metal structures. Preferably, the compatible acrylic and/or other compatible polymer should be at least 25% by weight and below 50% by weight so as to provide good adhesion while the primary properties of the PVDF molecular structure to stop infiltration of moisture, corrosive gases and the like is maintained.

A PVDF over coating or top coating in the form of a liquid coating is to be applied over the PVDF liquid under coating described herein after it has been applied to the metal structure and/or element and has been allowed to cure, e.g., air dry. The PVDF liquid over coating is similar to the PVDF liquid under coating previously described except that the coating will be highly fluorinated to the level of at least 70%, and in some cases up to 100%, with PVDF or PVDF copolymer or blends thereof that have more than 60% by weight of PVDF molecular structure.

Such PVDF over coating can be applied in a like range of thicknesses and in like manners to those described above for the PVDF coating that is applied directly to the metal structure and/or element. The PVDF over coating will improve the effectiveness and further extend the duration of the protection barrier provided by the underlying PVDF coating on the metal against water, salt, chemicals and other deleterious substances.

Figure 9A:
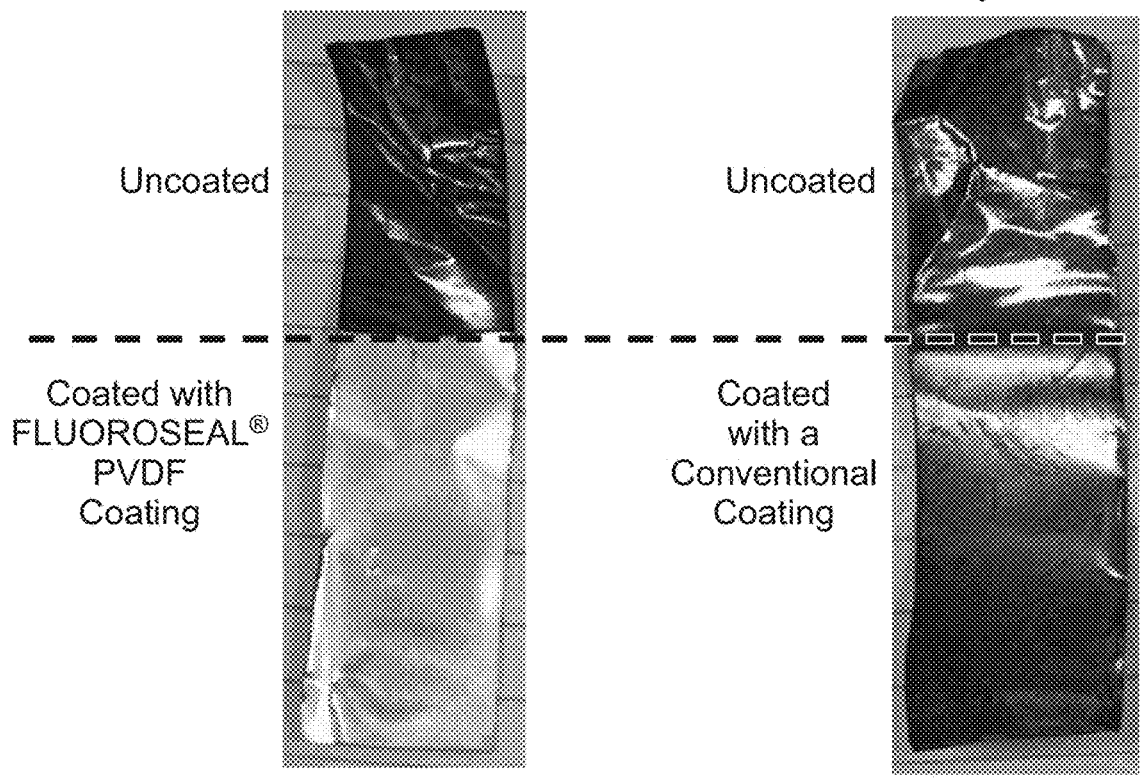
FIG. 9A is a side-by-side comparison of a pair of metal strips partly uncoated (upper parts) and with lower parts coated with the coating according to the present method (left image) and with a conventional coating (right image)
Figure 9B:
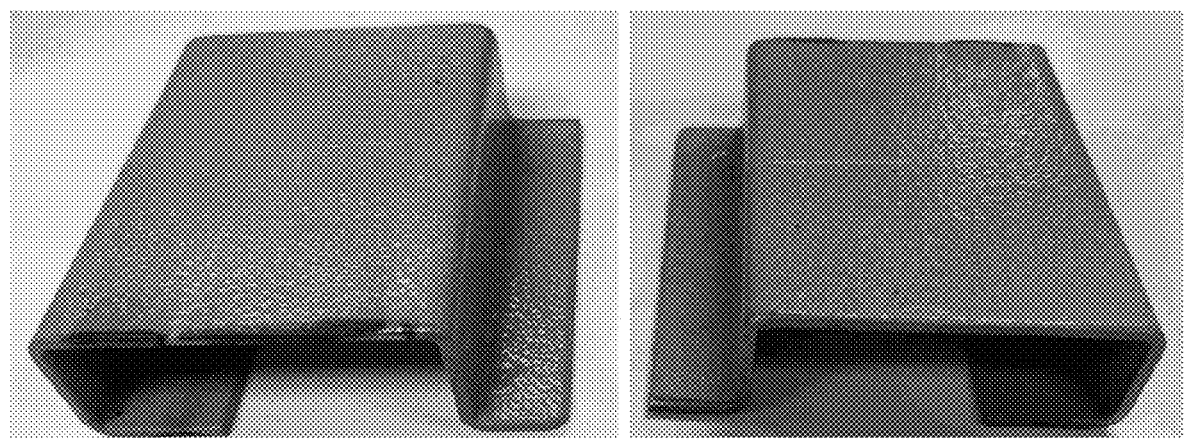
FIG. 9B is a side-by-side comparison of a pair of channels that were coated with a conventional coating (left image) and with a conventional coating and the coating according to the present method (right image).

FIG. 9A is a side-by-side comparison of a pair of metal strips partly uncoated (upper parts) and with lower parts coated with the anti-corrosion coating according to the present method (left image) and with a conventional coating (right image); and FIG. 9B is a side-by-side comparison of a steel channel that is coated with a conventional coating (left image) and with a conventional coating and the PVDF anti-corrosion coating according to the present method (right image).

Specifically, the aluminum strips of FIG. 9A were left half uncoated, i.e. the upper halves were not coated, while the respective lower halves thereof were coated with a protective coating. The lower half of the aluminum strip in the image at the left was coated with a modified PVDF coating, e.g., FLUOROSEAL® CPC-7150, as described herein, and the lower half of the aluminum strip in the image at the right was coated with a conventional coating material, e.g., a coating with an acrylic type molecular structure. Both strips were exposed to a high humidity environment that contained a sulfur gas at an elevated temperature, e.g., air plus hydrogen sulfide gas at about 85-100% relative humidity and a temperature of about 60° C. for about 240 hours. The lack of corrosion of the strip area coated with the modified PVDF FLUOROSEAL® coating and the clearly evident blackened areas, e.g., aluminum sulfide corrosion, of the parts of bare aluminum and of the aluminum coated with a conventional acrylic coating.

Further, section of a steel channel of FIG. 9B is coated with FBE (fused bonded epoxy) epoxy coating and has been cut crosswise at each end so that the steel at the ends thereof is exposed, thereby to simulate a loss of its FBE protective epoxy coating, as might occur from mechanical damage, stress cracking at a corner and the like. The end of the steel channel shown in the image at the left was left with its bare cut end. The end of the steel channel in the image at the right has been coated with a modified PVDF coating, e.g., FLUOROSEAL® CPC-7150, as described herein after this end was cut. The steel channel was then immersed in warm (~60° C.) salt water for about 24 hours to accelerate any penetration of the coatings and any corrosion that might occur. As is evident, the bare end shows clear corrosion resulting from the salt water, and that corrosion has already begun to migrate under the FBE coating. However, the end over coated with the PVDF coating shows no sign of corrosion, either at the cut end or under the FBE coating.

A method of protecting a metal structure with a coating, may comprise: applying a first and then applying a second liquidous coating to the metal structure, wherein the first liquidous coating solution once dried has at least the following properties:
  the polymer portion of the first coating when dried has at least 30% of fluorinated polymer segments in the PVDF homopolymer, copolymer or polymer blend; the first coating also has at least 30% of an acrylic or other compatible polymer;
  the first coating is in a liquidous form that can be applied by spraying and/or by brushing, or by another application method, onto metal surfaces,
  the first coating as applied is air dryable; and
  the first coating as applied has more than 3B cross-hatch adhesion onto a flat metal surface; and
wherein the second liquidous coating solution once dried has at least the following properties:
  the polymer portion of the second coating when dried has at least 75% of fluorinated polymer segments in the PVDF homopolymer, copolymer or polymer blend;
  the second coating is in a liquidous form that can be applied by spraying and/or by brushing, or by another application method, onto metal surfaces, and
  the second coating as applied is air dryable.

The first coating layer should have a thickness of at least 5-50 microns, and preferably of 50 microns to 100 microns, and the second coating layer may have a thickness of 5-100 microns, and more preferably from 20-50 microns, and more preferably of less than 200 microns. The fluorinated polymer may comprise at least 50% of polyvinylidene fluoride (PVF2 or polyvinylidene difluoride) in its molecular composition and more preferably more than 60% of PVDF molecular in the polymer composition. The coating may have more than 20% elongation capability without fracturing and even more preferably more than 50% elongation without fracturing. The coating may have a major portion of its molecular structure having a glass transition temperature of lower than 0° C., and preferably lower than −20° C., and even more preferably lower than −40° C. The coating preferably is transparent or clear. The coating if pigmented, may be pigmented with pigments including TiO2, Zn oxide, Zinc sulphate, Barium sulphate, carbon black, and/or a combination thereof. The coating may be applied to the exterior of a building or other structure. The coating may be applied to a surface of the metal structure that is exposed to an atmospheric environment. The coating may be applied to a vertical or horizontal surface of the metal structure. The coating is applied by spraying and/or by brushing.

Metal elements and parts may have conventional protective coating and primer materials thereon and then can be treated by chemical etching or other cleaning methods, and by applying the anti-corrosion PVDF coatings in accordance with the method described herein. For example, a base metal element, e.g., of a cold rolled or other steel, may be coated with a zinc coating, a zinc-enriched layer, a chromate coating, a polyester, epoxy polyurethane and/or silicone-modified polyester layer. In other examples, aluminum sheets and elements may receive a chromate coating, a powder metal, a FBE (powder coated epoxy), and/or other coating before the PVDF coating is applied in accordance with the method described herein.

In a first example, a protective anti-corrosion and antifouling PVDF coating may be applied to surfaces of clean aluminum and aluminum alloys and/or to surfaces of clean steel and steel alloys according to the method as described herein. A thin 10-100 micron top coating includes about 70-100% (by weight) PVDF polymers and/or copolymers and polymer blends, or fluorinated polymers, with 45-75% of its molecular structure having C—F bonding, dissolved in one or more suitable solvents. In this method and system, a FLUOROSEAL® PVDF coating with PVDF homopolymer and/or copolymer comprising about 25-75% of the polymer composition by weight or volume with suitable blending will form a "PVDF or equivalent coated surface" that acts as a primer for the about 80-100% PVDF top-coat to provide an even higher barrier to penetration by salt ions and a higher level of antifouling protection, e.g., from barnacles adhering to a hull or underwater structure. The hull or underwater structure is of a base metal, which often is a steel, at least part of which will typically be under the seawater line when the hull or structure is in use.

In a second example, the surfaces of clean aluminum and aluminum alloys and/or surfaces of clean steel and steel alloys have the "PVDF or equivalent coated surfaces" coated on top of priming such as a chemically etched and/or chromated metal surface. Alternatively, such coating can be converted to suitable film formats that can be heat-pressure-laminated coated on the underlying "PVDF or equivalent coated surfaces." In this method and system, FLUOROSEAL® PVDF coating with PVDF homopolymer and/or copolymer comprises about 25-75% of the polymer composition by weight or volume with suitable blending will form act like a primer for the about 80-100% PVDF top-coat to provide even higher barrier to salt ions penetration and higher level of anti-barnacles, antifouling protection of the base metal such as steel under the seawater line.

In a third example, the surfaces of clean aluminum and aluminum alloys and/or surfaces of clean steel and steel alloys have the "PVDF or equivalent coated surfaces" coated on top of priming such as a chemically etched and/or chromated surface on which one or more traditional coating layers, e.g., a powder coated epoxy (FBE) layer, polyurethane layer, an acrylic layer, and combinations thereof, is over coated, e.g., applied, onto the chemically etched or chromated metal surface. Over those layers is applied a FLUOROSEAL® PVDF coating with PVDF homopolymer and/or copolymer comprises about 25-75% of the polymer composition by weight or volume with suitable blending will form act like a primer for the 80-100% PVDF top-coat to provide even higher barrier to salt ions penetration and higher level of anti-barnacles, antifouling protection In alternative examples, the PVDF coatings as described herein can be converted to suitable powder formats that can be applied and baked onto the surfaces of "PVDF or equivalent coated surfaces" that are coated on metal surfaces that are cleaned of debris and contaminants that are detrimental for adhesion. Also alternatively, such coating can be converted to suitable film formats that can be heat-pressure-laminated to be coated on the underlying "PVDF or equivalent coated surfaces." Therein the FLUOROSEAL® PVDF baked on or film under coating with PVDF homopolymer and/or copolymer comprising about 25-75% of the polymer composition by weight or volume with suitable blending is applied first and will serve as a primer for about the 80-100% PVDF top-coat, which can also be a baked on or film layer to provide the even higher barrier to salt ions and higher level of antifouling protection.

That is, for a comfortable margin of safety, any signs of the beginning of corrosion or of structural damage should be treated seriously.

AI Technology scientists and engineers believe that the exterior surfaces of metal structures and elements that are directly exposed to the weather ideally should be coated with a corrosion prevention coating that practically blocks substantially all moisture and corrosive gases from penetrating inside the metal structure from the exterior surfaces.

Interior surfaces where temperature and humidity are kept within human living condition ranges may be exempted with the same treatment. However, those structures where interior and exterior faces the same weather environment should be coated with the same corrosion protection barrier coating that blocks substantially all moisture and corrosive gases.

As used herein, the term "PVDF" refers to a modified polyvinylidene fluoride material and/or to a polyvinylidene difluoride material, as well as to blends and copolymers thereof. "PVDF" and "polyvinylidene fluoride or polyvinylidene difluoride" liquid coating materials include, for example: polyvinylidene fluoride solvent-based liquid coating materials, polyvinylidene difluoride liquid coating materials, and a combination of polyvinylidene fluoride liquid coating materials and polyvinylidene difluoride liquid coating materials. In some instances, such liquid coating materials may also include additives, e.g., pigments, colorants, inorganic and/or metallic fillers, other additives, and the like, that do not materially degrade the ability of such coating materials to substantially block the passage of moisture and/or undesirable gases and the like.

The term in situ is a Latin phrase that translates literally to "on site" or "in position." It can mean "locally", "on site", "on the premises", or "in place" to describe where an event takes place. As used herein "in situ" includes places where buildings, bridges, towers and other structures exist and/or are constructed, assembled, manufactured or otherwise made, whether indoors and/or outdoors, and includes the exteriors and/or the interiors thereof. Thus in situ includes on-site construction as well as manufacture in a factory or other facility.

A method of coating a surface of a metal structure in situ, which comprises the steps of applying a liquidous under coating of a modified polyvinylidene fluoride (PVDF) or polyvinylidene difluoride (PVDF) material in an air dryable solution, and then applying a liquidous over coating of a modified polyvinylidene fluoride (PVDF) or polyvinylidene difluoride (PVDF) material in an air dryable solution comprising: wherein the liquidous under coating solution once dried has at least the following properties: (a) a PVDF or a PVDF co-polymer or a combination of PVDF and PVDF copolymer to form a blend with compatible acrylic and/or other compatible polymer that is fluorinated to between about 30% to about 75% by weight excluding any solvent; (b) the PVDF or PVDF co-polymer or blend thereof having at least about 45% PVDF molecular structure by weight when dried; (c) the PVDF or PVDF co-polymer having a polymer crystallinity of at least about 30% by weight; and (d) wherein the coating has a cross-hatch adhesion to metal of at least 3B when measured using the ASTM D3359 Method B scale; the liquidous under coating solution is made with a solvent selected from the group consisting essentially of ketones, acetate, ester alcohol, propylene carbonate, a combination thereof, and combinations of solvents having a polarity index in the range of about 3.0 to 7.0; and wherein the liquidous over coating solution once dried has at least the following properties: (a) a PVDF or a PVDF co-polymer or a blend thereof that is fluorinated to between about 70% to about 100% by weight excluding any solvent; (b) the PVDF or PVDF co-polymer or blend thereof having at least about 75% PVDF molecular structure by weight when dried; and (c) the PVDF or PVDF co-polymer having a polymer crystallinity of at least about 30% by weight; and the liquidous over coating solution is made with a solvent selected from the group consisting essentially of ketones, acetate, ester alcohol, propylene carbonate, a combination thereof, and combinations of solvents having a polarity index in the range of about 3.0 to 7.0.

The method of coating a surface of a metal structure in situ, may further comprise the steps of: (a) brushing the surface of the metal or cleaning the surface of the metal with a cleaning agent selected from the group consisting essentially of: water, soap and water, a detergent, a solvent, sand-blasting, and any combination thereof; and then (b) the applying the under coating of the modified PVDF material of claim 1 to the cleaned surface of the metal. The cleaning the surface of the metal with a cleaning agent may include: applying the cleaning agent to the surface of the metal by brushing, rolling and/or spraying. The step of applying the under coating of a modified PVDF material to the surface of the metal and/or the step of applying the over coating of a modified PVDF material to the under coating may comprise: applying the under coating and/or over coating using a brush or using a roller or using a spraying device or using a combination of the foregoing. The under coating of the modified PVDF material on the surface of the metal may have a thickness of between about 20 microns and 50 microns; and/or the over coating of the modified PVDF material on the under coating may have a thickness of between about 10 microns and 50 microns. Also, the under coating of the modified PVDF material on the surface of the metal has a thickness of less than about 150 microns; and/or the over coating of the modified PVDF material on the under coating has a thickness of less than about 200 microns. The under coating of the modified PVDF material on the surface of the metal may have a thickness of at least about 5-50 microns and/or the over coating of the modified PVDF material on the under coating may have a thickness of at least about 5-100 microns. The compatible acrylic and/or other compatible polymer of the modified PVDF material in an air dryable solution may include: an acrylic, an epoxy, a polyurethane, or a blend thereof, of at least 25% by weight. The metal may include: iron, steel, aluminum, copper, another non-noble metal, and/or alloys thereof.

The metal structure to which the under coating and the over coating of the modified PVDF material in an air dryable solution is applied may include: at least vertical load bearing structural elements of the metal structure; or at least vertical and horizontal load bearing structural elements of the metal structure. The applying the over-coating of a modified PVDF material may comprise: applying the over-coating using a brush or using a roller or using a spraying device or using a combination of the foregoing. The surface of the metal structure may be previously coated with an epoxy, an acrylic, an alkyd, a polyurethane or another polar coating.

As used herein, the term "about" and "substantial" and "substantially" mean that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of ordinary skill in the art. In general, a dimension, size, formulation, parameter, shape or other quantity or characteristic is "about" or "approximate" or "substantial" or "substantially" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." Likewise, a phrase in the form "A, B and/or C" or a phrase in the form "A and/or B and/or C" includes "A," "B," "C," "A and B," "A and C," "B and C," and "A and B and C." In addition, the term "at least one of" one or more elements is intended to include one of any one of the elements, more than one of any of the elements, and two or more of the elements up to and including all of the elements, and so, e.g., phrases in the form "at least one of A, B and C" include "A," "B," "C," "A and B," "A and C," "B and C," and "A and B and C."

As used herein, the term "predetermined" means determined in advance or before hand with respect to whatever the term pertains to. The term may be used with respect to a physical object or thing and/or with respect to an intangible thing, e.g., a signal or data, and the like. Examples thereof may include a fixed value, position, condition and/or limit, however, predetermined is not limited to a fixed value, position, condition and/or limit. A predetermined value, position, condition and/or limit may change or otherwise vary over time, over a sequence and/or over a randomized series of values, positions, conditions and/or limits.

As used herein, the term "plurality" means plural, two or greater in number of whatever the term pertains to, i.e. more than one. The term may be used with respect to a physical object or thing and/or with respect to an intangible thing, e.g., a signal or data, and the like. Examples thereof may include a fixed or movable thing, a fixed value, a changeable value, position, condition and/or limit, and the like.

As used herein, the terms "substantial" and "substantially" mean that the thing referred to as being "substantial" or "substantially" is sufficiently similar in form and/or function as to function in the invention in a manner that is encompassed by the description and/or claims herein or an equivalent thereof.

While various operations, steps and/or elements of a process or method or operation may be described in an order or sequence, the operations, steps and/or elements do not need to be performed in that order or sequence, or in any particular order or sequence, unless expressly stated to require a particular order or sequence.

Further, what is stated as being "optimum" or "deemed optimum" may or may not be a true optimum condition, but is the condition deemed to be desirable or acceptably "optimum" by virtue of its being selected in accordance with the decision rules and/or criteria defined by the designer and/or applicable controlling function, e.g., while Applicant believes that the thickness of the PVDF coating material should be in the range of 50 to 150 microns, which provides a balance of sufficient moisture protection and reasonable material cost, somewhat thinner coatings will provide a lesser but still substantial measure of moisture resistance, while thicker coatings will provide the same substantial moisture protection but will cost more due to a greater amount of coating material being used.

While the present invention has been described in terms of the foregoing example embodiments, variations within the scope and spirit of the present invention as defined by the claims following will be apparent to those skilled in the art. For example, other means of applying the coating material may be utilized and still produce the same substantial moisture resistance that are produced using the example methods of rolling, brushing and spraying.

Further, it is not necessary that the under coating or primer PVDF layer and the over coating or top coating layer be applied by the same method, e.g., one could be brushed on and the other sprayed on.

While certain features to which the coating materials may be applied may be described as a raised feature, e.g., a column, beam, ridge, boss, flange, projection, detent, or other raised feature, such feature may be positively formed or may be what remains after a recessed feature, e.g., a groove, slot, hole, indentation, recess, detent, or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made. In addition, where a raised feature engages a recessed feature, such as a cylindrical projection that engages a complementary receptacle, the relative positions of the raised and recessed features may be interchanged or other wise modified.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A method of coating a surface of a metal structure in situ, which comprises the steps of applying a liquidous under coating of a modified polyvinylidene fluoride (PVDF) or polyvinylidene difluoride (PVDF) material in an air dryable solution, and then applying a liquidous over coating of a modified polyvinylidene fluoride (PVDF) or polyvinylidene difluoride (PVDF) material in an air dryable solution comprising:
  wherein the liquidous under coating solution once dried has at least the following properties:
    (a) a PVDF or a PVDF co-polymer or a combination of PVDF and PVDF copolymer to form a blend with compatible acrylic and/or other compatible polymer that is fluorinated to between about 30% to about 75% by weight excluding any solvent;
    (b) the PVDF or PVDF co-polymer or blend thereof having a molecular structure that is at least about 45% PVDF by weight when dried;
    (c) the PVDF or PVDF co-polymer having a polymer crystallinity of at least about 30% by weight; and
    (d) wherein the coating has a cross-hatch adhesion to metal of at least 3B when measured using the ASTM D3359 Method B scale;
      the liquidous under coating solution is made with a solvent selected from the group consisting of ketones, acetate, ester alcohol, propylene carbonate, a combination thereof, and combinations of solvents having a polarity index in the range of about 3.0 to 7.0; and wherein the liquidous over coating solution once dried has at least the following properties:
- (a) a PVDF or a PVDF co-polymer or a blend thereof that is fluorinated to between about 70% to about 100% by weight excluding any solvent;
- (b) the PVDF or PVDF co-polymer or blend thereof having a molecular structure that is at least about 75% PVDF by weight when dried; and
- (c) the PVDF or PVDF co-polymer having a polymer crystallinity of at least about 30% by weight; and the liquidous over coating solution is made with a solvent selected from the group consisting of ketones, acetate, ester alcohol, propylene carbonate, a combination thereof, and combinations of solvents having a polarity index in the range of about 3.0 to 7.0.

2. The method of coating a surface of a metal structure in situ, of claim 1, which further comprises the steps of:
- (a) brushing the surface of the metal or cleaning the surface of the metal with a cleaning agent selected from the group consisting essentially of water, soap and water, a detergent, a solvent, sand-blasting, and any combination thereof; and then
- (b) the applying the under coating of the modified PVDF material of claim 1 to the cleaned surface of the metal.

3. The method of coating a surface of a metal structure in situ, of claim 2, wherein the step of: cleaning the surface of the metal with a cleaning agent includes:
applying the cleaning agent to the surface of the metal by brushing, rolling and/or spraying.

4. The method of coating a surface of a metal structure in situ, of claim 1, wherein the step of applying the under coating of a modified PVDF material to the surface of the metal and/or the step of applying the over coating of a modified PVDF material to the under coating comprises: applying the under coating and/or over coating using a brush or using a roller or using a spraying device or using a combination of the foregoing.

5. The method of coating a surface of a metal structure in situ, of claim 1:
wherein the under coating of the modified PVDF material on the surface of the metal has a thickness of between about 20 microns and 50 microns; and/or
wherein the over coating of the modified PVDF material on the under coating has a thickness of between about 10 microns and 50 microns.

6. The method of coating a surface of a metal structure in situ, of claim 1:
wherein the under coating of the modified PVDF material on the surface of the metal has a thickness of less than about 150 microns; and/or
wherein the over coating of the modified PVDF material on the under coating has a thickness of less than about 200 microns.

7. The method of coating a surface of a metal structure in situ, of claim 1:
wherein the under coating of the modified PVDF material on the surface of the metal has a thickness of at least about 5-50 microns; and/or
wherein the over coating of the modified PVDF material on the under coating has a thickness of at least about 5-100 microns.

8. The method of coating a surface of a metal structure in situ, of claim 1, wherein the compatible acrylic and/or other compatible polymer of the modified PVDF material in an air dryable solution includes: an acrylic, an epoxy, a polyurethane, or a blend thereof, of at least 25% by weight.

9. The method of coating a surface of a metal structure in situ, of claim 1, wherein the metal includes: iron, steel, aluminum, copper, another non-noble metal, and/or alloys thereof.

10. The method of coating a surface of a metal structure in situ, of claim 1, wherein the metal structure to which the under coating and the over coating of the modified PVDF material in an air dryable solution is applied includes:
at least vertical load bearing structural elements of the metal structure; or
at least vertical and horizontal load bearing structural elements of the metal structure.

11. The method of coating a surface of a metal structure in situ, of claim 1, wherein the step of applying the over-coating of a modified PVDF material comprises: applying the over-coating using a brush or using a roller or using a spraying device or using a combination of the foregoing.

12. The method of coating a surface of a metal structure in situ, of claim 1, wherein the surface of the metal structure was previously coated with an epoxy, an acrylic, an alkyd, a polyurethane or another polar coating.

* * * * *